United States Patent
Arnold et al.

(10) Patent No.: US 6,515,777 B1
(45) Date of Patent: Feb. 4, 2003

(54) RING GAIN CONTROL IN WDM OPTICAL SIGNAL TRANSMISSION SYSTEM

(75) Inventors: Philip A Arnold, Rugby (GB); Paul A. Callan, Loughborough (GB); Harry R Claringburn, Nottingham (GB)

(73) Assignee: Marconi Communications Limited, Coventry (GB)

(*) Notice: Subject to any disclaimer, the term of this patent is extended or adjusted under 35 U.S.C. 154(b) by 0 days.

(21) Appl. No.: 09/391,757

(22) Filed: Sep. 8, 1999

(30) Foreign Application Priority Data

Mar. 12, 1999 (GB) ............................................ 9905731

(51) Int. Cl.[7] .............................................. H04J 14/02
(52) U.S. Cl. ..................... 359/128; 359/119; 359/161; 359/337
(58) Field of Search ................................. 359/128, 119, 359/161, 179, 127, 337; 370/223

(56) References Cited

U.S. PATENT DOCUMENTS

| | | | | |
|---|---|---|---|---|
| 5,838,488 A | * | 11/1998 | Kobayashi | .................. 359/341 |
| 5,903,371 A | * | 5/1999 | Arecco et al. | ............... 359/119 |
| 5,966,237 A | * | 10/1999 | Sugaya et al. | ............... 359/341 |
| 6,236,487 B1 | * | 5/2001 | Stephens | .................... 359/161 |
| 6,259,553 B1 | * | 7/2001 | Kinoshita | .................... 359/337 |
| 6,292,290 B1 | * | 9/2001 | Wan et al. | ............... 359/337.1 |

FOREIGN PATENT DOCUMENTS

| | | |
|---|---|---|
| WO | WO 96/19884 | 6/1996 |
| WO | WO 98/16018 | 4/1998 |

* cited by examiner

*Primary Examiner*—John Tweel
(74) *Attorney, Agent, or Firm*—Kirschstein, et al.

(57) ABSTRACT

A signal transmission system has a number of wave division multiplex optical carriers linking a number of switching units arranged in a closed ring network. The carriers are amplified to compensate for loss and attenuation, but the ring gain of each carrier must be less than unity to prevent unwanted signal oscillation. An automatic gain control arrangement is operative for each optical carrier which is detected as being present at a switching unit, and the gain control is disabled for each carrier which is detected as being absent.

10 Claims, 2 Drawing Sheets

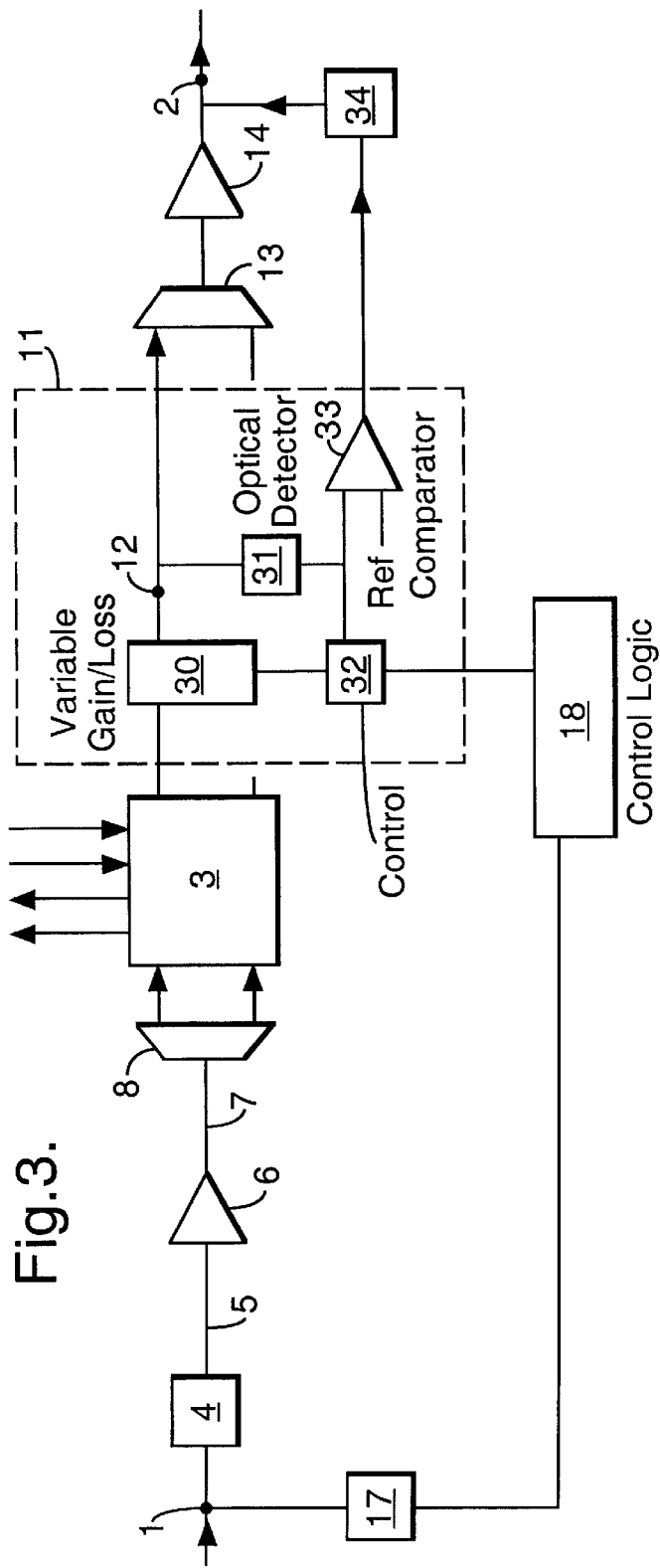

RING GAIN CONTROL IN WDM OPTICAL SIGNAL TRANSMISSION SYSTEM

BACKGROUND OF THE INVENTION

This invention relates to a signal transmission system, and more particularly to systems in which an optical carrier is used to carry data traffic. A number of optical carriers, each having a different wavelength, can be sent from an optical transmitter to an optical receiver via a light guide—such a technique is termed wavelength division multiplex (WDM), and each optical carrier able to carry traffic is commonly termed a channel.

Optical Add/drop Multiplexers (OADMs) and Optical Cross-connect Switches (OXCs), both of which comprise an optical switching unit, carry multiple traffic signals on the optical channels which are transmitted or received each on a different wavelength via one or a pair of optical fibres. Each OADM and OXC has at least two such wavelength division multiplexed (WDM) ports which can be configured to insert and extract signals from and to tributary ports or to pass signals straight through from one WDM port to another.

A common configuration for a network of OADMs or OXCs is a closed ring because it offers an alternative path for every connection allowing protection against failure of the optical fibre. In order to compensate for the loss of the interconnecting fibres and of the optical components within the OADM or OXC, it contains optical amplifiers. In a system containing amplification and a feedback path, the loop gain must be maintained at less than unity as otherwise unwanted oscillation will occur.

Under fault conditions, the loop gain of the ring may rise above unity, causing instability and malfunction of the ring. The present invention seeks to provide a signal transmission system in which this difficulty is reduced.

SUMMARY OF THE INVENTION

According to this invention, a signal transmission system having a plurality of WDM optical carriers, includes a plurality of optical switching units connected in a ring, means present at an optical switching unit for detecting the presence or absence of each individual optical carrier; and means responsive to the detection of the absence of an optical carrier for controlling the ring gain of that optical carrier to be less than unity.

Oscillation in one optical channel, which can be induced by automatic gain control in the absence of an optical carrier, can adversely affect other optical channels due to non-linear effects, power hogging in the amplifiers and crosstalk from the possibly high power oscillation. Even if the loop gain of the ring is less than unity Amplifier Spontaneous Emission (ASE) can accumulate in channels not carrying a normal optical signal to a level which can interfere with adjacent channels.

The optical switching unit may be an OADM or an OXC or other equivalent, and the following discussion of OADMs is applicable to such equivalents.

In OADMs which may be reconfigured (i.e. changes in the channels added, dropped and passed through) some degree of automatic gain control (AGC) is advisable to maintain the power of individual optical channels at a substantially fixed level. Precautions should be taken to ensure that operation of the AGC does not raise the overall gain of any optical channel to a value where oscillation or a disruptive level of ASE accumulation occurs under any conditions. Transient effects can also be a significant problem in linear and ring networks of OADMs resulting from both deliberate changes in the number of channels being carried and during fault conditions. Consider the case when a channel has no optical signal present on it. The AGC function on that channel at each OADM would set itself to maximum gain/minimum loss in an attempt to maintain the power level. When a signal is turned on for that channel the gain at each OADM will be higher than required until the AGC control loops have time to respond. During this transient this signal at each OADM will be raised to an increasingly high level at which it will hog the available power of the optical amplifiers, reducing the signal levels of pre-existing channels and adversely affecting the traffic on them. The transient exists until the AGC control loops settle to their target output powers and optical amplifier control loops accommodate to the increased total output power. While this effect can be partially alleviated by slowly ramping up the power of the new optical signal source this places constraints on the time constants of the various amplifier and AGC control loops. Under fault conditions ramping up the power of the source may not be possible.

These difficulties are reduced by the present invention.

BRIEF DESCRIPTION OF THE DRAWINGS

The invention is further described by way of example with reference to the accompanying drawings, in which:

FIGS. 2 and 3 show alternative configurations of part of the system in greater detail.

DETAILED DESCRIPTION OF THE PREFERRED EMBODIMENTS

Figure 1:
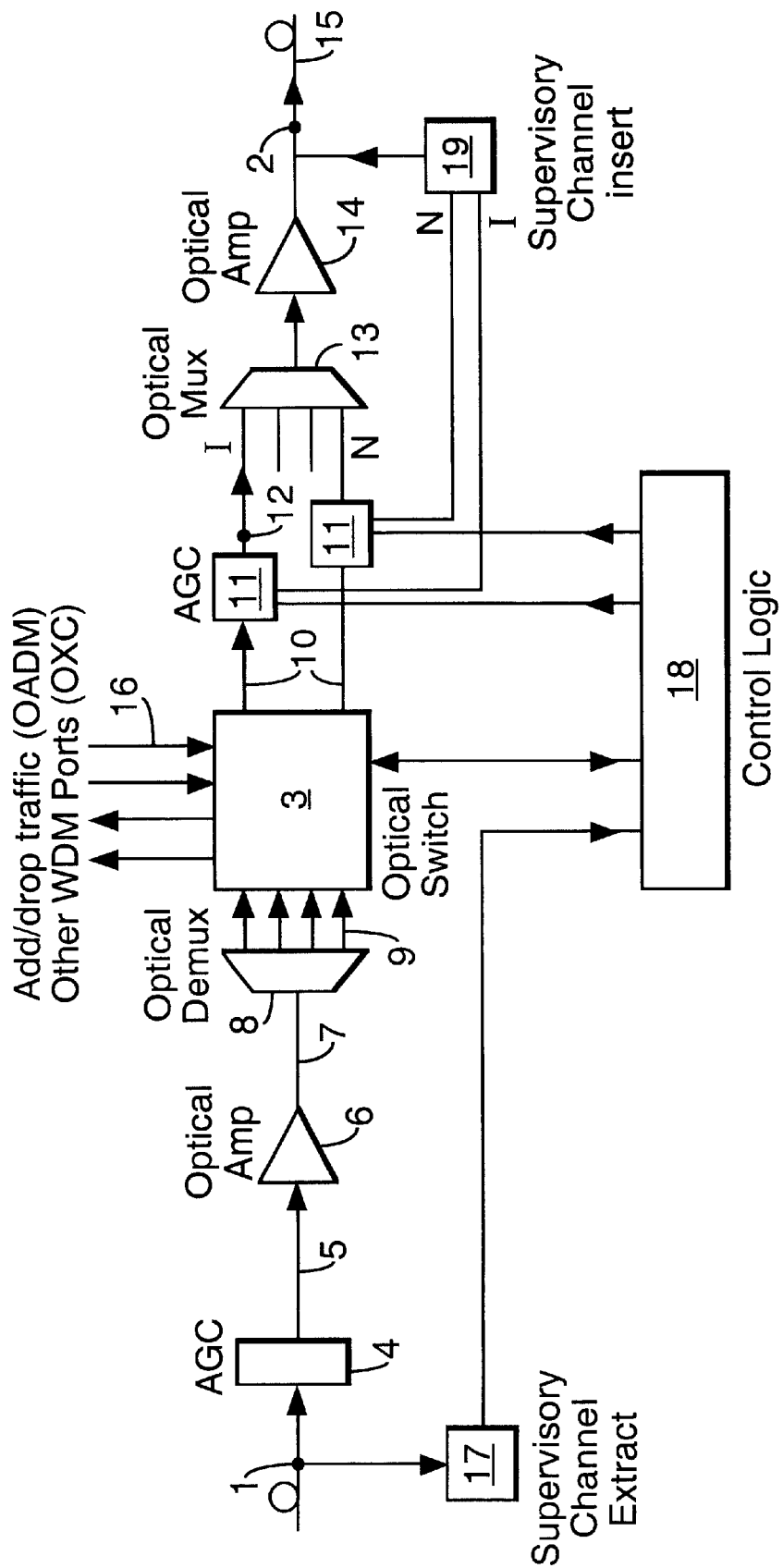
FIG. 1 shows part of a signal transmission system in accordance with the present invention.

Referring to FIG. 1, there is shown therein just part of a signal transmission system in which a plurality of optical switching units comprising OADMs and OXCs are connected in a bidirectional closed ring. Only a single optical switching unit is shown. The figure illustrates just one unidirectional signal path for a WDM optical signal from one input WDM port 1 to one WDM output port 2 via an optical switch 3, which can be part of an OADM or an OXC as the case may be. In practice, an OADM would usually have the same configuration repeated so as to also carry signals in the opposite direction to that illustrated. OXCs will usually have a multiplicity of input and output ports interconnected by a more complicated optical switch.

The system is first described assuming that it operates under fault-free conditions. The input port 1 is connected to an AGC arrangement 4 which maintains a constant power per channel (i.e. optical wavelength) at point 5 independently of the input power per channel at port 1. Typically the input signal at port 1 contains at least eight optical channels, each at a different optical wavelength. An optical amplifier 6 operates in a gain controlled regime having a flat frequency response so as to amplify each optical channel equally, thereby giving a constant power per channel at point 7. An optical demultiplexer 8 separates the optical channels by wavelength onto individual optical waveguides 9 for cross connection by means of the optical switch 3. Input and output ports 16 of the optical switch allow channels to be added or dropped. The outputs of the optical switch 3 will be from different inputs depending on configuration so that the optical power per channel point 10 has some variation. A further AGC arrangement 11 maintains a constant power per channel at points 12.

These channels are combined into a WDM signal by optical multiplexer 13. The loss, or signal attenuation introduced by the multiplexer 13 is substantially constant for each optical channel and optical amplifier 14 operates in a gain-controlled regime so that the optical power per channel at the output port 2 is maintained substantially constant. The combined effect of the AGC arrangements 4 and 11 and gain-controlled amplifiers 6 and 14 ensures that the gain from the output of one OADM (one OADM being shown in FIG. 1) through a section of interconnecting fibre 15 to the output of the next OADM is nominally unity with a small spread. Where traffic is carried in a ring there must be at least two nodes (the nodes sourcing and sinking the traffic) where the optical switches are in the add/drop configuration. The through loss of the switch in the add/drop configuration is large, typically 30 dB, which, for both nodes means that the loop gain is reduced by 60 dB. This is very much greater than the worst case sum of gain spread above nominal for all hops in the ring. The loop gain of the ring is therefore guaranteed to be much less than unity.

Port 1 also receives a supervisory optical channel which does not carry traffic, and is used for signalling and management purposes. This is extracted by the supervisory channel extract unit 17, and its signalling information routed to control logic 18, which is linked to the operation of the optical switch 3, and the AGC arrangements 11. One function of the control logic is described in connection with FIG. 3. The control logic 18 reformats the supervisory channel and inserts it by a supervisory channel insert unit 19 onto the output port 2.

Considering fault conditions, should the source of an optical signal fail, AGC arrangement 11 forming part of that channel would increase its gain in an attempt to maintain a constant power at point 12. This would happen at each OADM in the ring subsequent to the failure so that the through gain for this failed channel would be substantially increased, say by X dB. The overall loop gain in a ring of N OADMs would be increased by N×X dB. As an example, take X=10 dB and N=8, then the loop gain would increase by 80 dB which is more than the loss of the optical switches at the source and sink nodes. The loop gain around the ring would be far greater than unity so oscillation would then occur at the wavelength of this optical channel.

In order to avoid this difficulty, the AGC arrangement 11 includes means of detecting that its input optical signal is absent, and in response to that overrides the gain control mechanism to set it to minimum gain. FIGS. 2 and 3 show alternative arrangements for achieving this condition.

Referring to FIG. 2, the input port 10 is connected to the output port 12 via a variable gain/loss device 20. The port 12 is also connected via an optical power detector 21 to a control unit 22 which adjusts the gain or loss of the device 20, so as to comprise a feedback loop. An additional optical power detector 23 at the input port 10 feeds a threshold detector 24, such that when the optical power level at port 10 falls below a threshold value (the fail condition) the output of a comparator 24 changes state. The threshold value is set by the reference input 25 and it is this threshold which determines the level at which an input channel is present or absent. If necessary, the threshold can be adjusted to determine an optimum level for reliability of operation. The comparator 24 provides an additional input to the control unit 22 to disable the feedback loop, and to force the variable gain/loss device 20 to its lowest gain or maximum loss. In practice, the device 20 may be a variable gain amplifier having a gain characteristic which is flat across the wavelength band of interest, or alternatively it can be a variable attenuator followed by a preset-gain amplifier.

Referring to FIG. 3, an alternative arrangement is shown which avoids the need for the second optical detector 23 of FIG. 2. In addition to illustrating the AGC arrangement 11, it shows modifications to the optical switching unit of FIG. 1. A feedback loop comprises a variable gain/loss device 30, an optical power detector 31, and a control unit 32, in a manner similar to FIG. 2. The optical detector 31 is coupled to one input of a comparator 33 whose output changes state to the fail condition if the optical power at point 12 is less than the value the AGC loop is attempting to be maintain. This mechanism cannot be used directly to set the AGC loop to minimum gain/max loss because recovery from this condition would not be possible. The fail condition is signalled to the next OADM in the ring via a supervisory channel transmitter 34. The supervisory channel may be carried on an optical channel additional to those carrying traffic, known as an optical supervisory channel, or by other means. The next OADM on the ring extracts the signalled condition of the optical channels by means of the supervisory channel receiver 17 and by knowledge of the configuration of the optical switch can determine in control logic 18 whether the failed optical channel is connected to one of its variable gain/loss devices 30. If it is, the control logic 18 overrides the AGC loss forcing it to set the variable gain/loss device 30 to lowest gain/maximum loss. The fault condition is signalled on to the next OADM as before on the supervisory channel via the supervisory channel insert unit 34.

The result is that the AGC arrangement 11 in the first OADM which detects the fail condition sets to highest gain/minimum loss but all AGC arrangements 11 for this failed channel in subsequent OADMs are set to lowest gain/maximum loss. The overall gain around the ring is therefore held substantially less than unity.

In both FIGS. 2 and 3 the variable gain/loss element may be an optical amplifier (Semiconductor Optical Amplifier, or Erbium Doped Fibre Amplifier) or an electrically controlled optical attenuator.

Both of these solutions also greatly reduce the effect of transient power changes since at most one OADM, or other optical switching unit, is operating at maximum gain and all subsequent OADMs operate at maximum loss until after the new signal is applied. The speed of the AGC control loop is designed so that when the new signal is detected it ramps up the amplitude sufficiently slowly to allow the optical amplifiers to accommodate to the increasing output power required without affecting the pre-existing channels.

We claim:

1. A signal transmission system having a plurality of wavelength division multiplex (WDM) optical carriers having a respective optical wavelength, the system comprising: a plurality of optical switching units connected in a ring; detecting means present at an optical switching unit for detecting a presence or absence of each of the plurality of optical carriers; and means for separately controlling a gain of the ring at each of the plurality of optical wavelengths, said controlling means being responsive to the detection of the absence of an optical carrier and being operable to control the ring gain at that optical carrier wavelength to be less than unity.

2. The system as claimed in claim 1, wherein each optical switching unit includes a channel multiplexer, and wherein said detecting means is positioned in an input channel path of said multiplexer.

3. The system as claimed in claim 2, wherein said detecting means is positioned in every input channel path of said multiplexer.

4. The system as claimed in claim 1, further comprising an automatic gain control arrangement for adjusting a level of an optical carrier which is detected as being present.

5. The system as claimed in claim 4, wherein said automatic gain control arrangement is disabled when an optical carrier is detected as being absent, so as to permit the gain of the channel of that optical carrier to be reduced.

6. The system as claimed in claim 4, wherein said automatic gain control arrangement includes a variable gain optical amplifier.

7. The system as claimed in claim 4, wherein said automatic gain control arrangement includes a variable optical attenuator.

8. The system as claimed in claim 4, further comprising means to detect a presence or absence of an input to the automatic gain control arrangement for each optical carrier.

9. The system as claimed in claim 4, wherein an optical detector forms part of the automatic gain control arrangement and forms part of the detecting means, and wherein detection of an absence is signaled to the next optical switching unit in the ring to cause it to reduce its optical gain for that carrier.

10. The system as claimed in claim 4, wherein the automatic gain control arrangement has a control loop speed which is made sufficiently slow to avoid power hogging by an optical carrier suffering transient disturbances.

\* \* \* \* \*